Sept. 6, 1955  L. D. JONES  2,717,119
CENTRIFUGAL SEPARATOR
Filed Nov. 3, 1951  3 Sheets-Sheet 1

INVENTOR.
LEO D. JONES
BY *Hugo G. Kenniman*
ATTORNEY

Sept. 6, 1955  L. D. JONES  2,717,119
CENTRIFUGAL SEPARATOR

Filed Nov. 3, 1951  3 Sheets-Sheet 2

INVENTOR.
LEO D. JONES
BY Hugo G. Kernman
ATTORNEY

Sept. 6, 1955     L. D. JONES     2,717,119
CENTRIFUGAL SEPARATOR
Filed Nov. 3, 1951     3 Sheets-Sheet 3

INVENTOR.
LEO D. JONES
BY Hugo G. Femman
ATTORNEY

United States Patent Office 2,717,119
Patented Sept. 6, 1955

2,717,119

CENTRIFUGAL SEPARATOR

Leo D. Jones, Philadelphia, Pa., assignor to The Sharples Corporation, a corporation of Delaware Application November 3, 1951, Serial No. 254,683

9 Claims. (Cl. 233—21)

This invention pertains generally to centrifuges, and particularly to a centrifuge adapted to separate semi-viscous or viscous substances as the lighter layer from heavier liquid substances which latter are separated as the heavier layer.

The invention will be described more particularly in connection with the problem of separating cream from milk at temperatures lower than those normally employed in the art, at which lower temperatures the cream, as it separates by subsidence in the centrifuge bowl from the heavier skim milk layer, is relatively thicker or more viscous, and, therefore, less fluid, with the result that, in the use of conventional machines of the prior art, as the centrifuging continues, thicker portions of the cream tend to gradually build up at the center of the bowl with increasing reduction in separating efficiency, and eventually causing clogging.

It is to be understood, however, that the invention may be applied to the centrifugal separation of liquids generally, and particularly when similar problems are involved.

It is common practice to operate centrifuges for the separation of cream from skim milk with feed milk temperatures of around 100° F. and higher. At these temperatures the separated cream is quite fluid, and very little, if any, difficulty is experienced in the discharge of the cream from the centrifuge bowl. Due to the fact that whole milk is commonly cooled to and held at lower temperatures, for example, around 40° F., during temporary storage and shipping to the point of cream separation, in order to maintain it, in so far as possible, in its original fresh state, this requires a heating operation prior to centrifuging. Such heating operation not only consumes time and thus delays the centrifuging operation, but also requires the installation and maintenance of expensive milk heating equipment and the use of fuel to keep such equipment in operation.

Consequently, there has been, for many years, a very considerable demand for a centrifuge bowl which will alleviate or overcome the difficulties of cream accumulation and clogging when operated on whole milk at such lower temperatures, and which will discharge the cream continuously, at least over a much longer period of time.

By the use of the centrifuge bowl of my invention, the above-mentioned difficulties when operating at such lower temperatures are very materially overcome, with the result that excessive accumulation of undischarged cream at the center of the bowl and clogging are either entirely overcome, or are alleviated to such an extent as to permit efficient operation over a much longer period of time than is possible with the conventional types of centrifuge bowls now in use.

Further features and advantages of my invention will become become apparent to persons skilled in the art as the description proceeds, and upon reference to the drawings in which.

Figure 1:
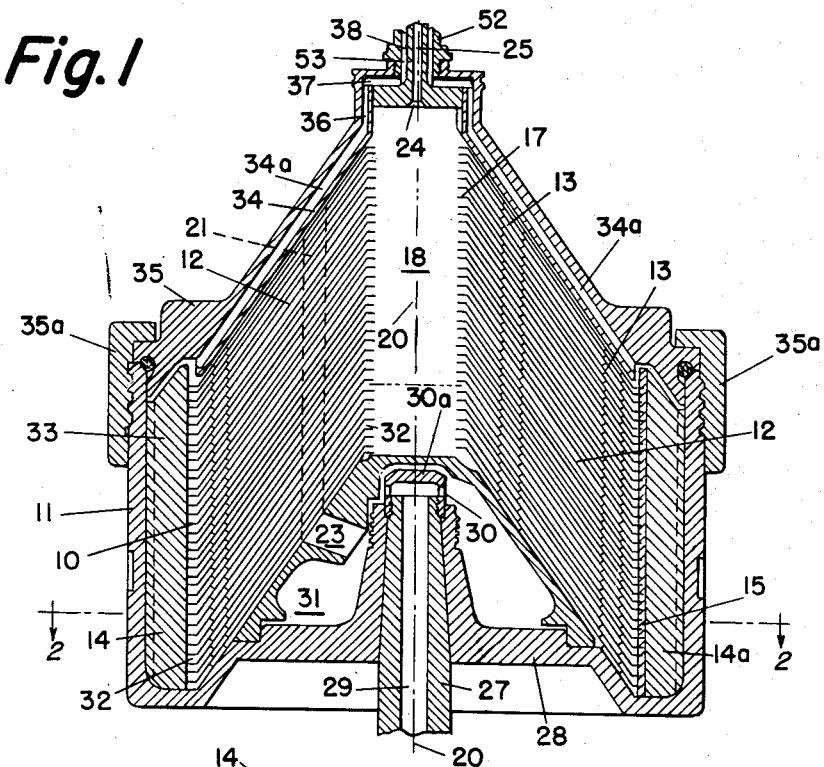
Figure 1 is a sectional elevation of a centrifuge bowl, taken on line 1—1 of Figure 2.
Figure 2:
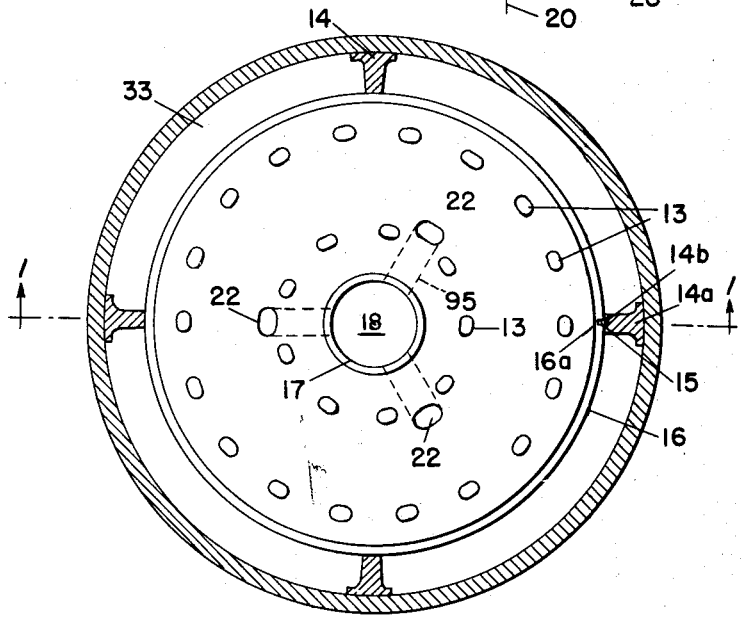
Figure 2 is a cross-sectional view taken on line 2—2 of Figure 1.

Referring now to Figures 1 and 2 of the drawings, conical discs 10 having central holes, as shown, are spaced vertically in relation to each other in the separating chamber inside the bowl shell 11 to form the disc-stack 12 in more or less conventional manner. The vertical spacing of the discs is accomplished by any suitable means, such as by means of spacers 13 fastened to the upper surfaces of the discs to form thin separating spaces between the discs. As illustrated, the disc-stack 12 is held in position laterally in relation to bowl shell 11 by means of ribs or wings 14, of which rib or wing 14a contains a key slot 14b in which is fixed key 15. The outer edge 16 of each disc 10 of disc-stack 12 has a key slot 16a which fits over the extending portion of key 15, thus holding the disc-stack in position. As shown, the inner peripheral edges 17 of the individual discs 10 of the disc-stack 12 retain the spaced relation referred to above, and form or bound an unobstructed vertical channel or free space 18 extending axially. Channel 18 is shown coaxial with the axis of rotation 20 of the bowl.

Feed channel 29, in spindle or feed pipe 27, as well as outlet opening 24, and light component outlet channel or passage 25, are also shown coaxial with the axis of rotation 20 of the bowl.

Each of the discs 10 of the disc-stack 12 are shown with holes 22 positioned outwardly from said channel or free space 18 and one above the other to form vertical channels 21 extending through the vertical length of disc-stack 12 from channels or feed passages 23 up to dividing cone 34, there being one channel 23 for each channel 21. Dividing cone 34 is provided with a plurality of longitudinal ribs 34a spaced circumferentially, and which are engaged by bowl top 35 to form together with passages 36, 37 and 38 a heavy component outlet passage leading from the outer part or section of the separating chamber and to hold cone 34 and in turn disc-stack 12 in place. Bowl top 35 is secured to bowl shell 11 by an inwardly flanged collar 35a which threadedly engages bowl shell 11.

In operation, after the bowl is brought up to speed, the liquid to be separated, such as whole cold milk at a temperature of say 40° F., for example, is continuously fed into the bowl through channel 29 and inlet openings 30 in cap 30a. The liquid passes into chamber or hollow nave 31 and through channels 23 and vertical channels 21 into the spaces 32 between the discs 10 of disc-stack 12. In spaces 32 the liquid, such as the cold whole milk referred to above, is subjected to the action of centrifugal force and is separated, in the case of said whole milk, into cream and skim milk.

The separated heavier phase, such as, the skim milk, passes outward in relation to the axis of rotation 20 of the centrifuge, and downward through the spaces 32 between the discs 10 into zone or section 33. From zone 33 it passes upward between dividing cone 34 and bowl top 35, and out of the centrifuge through passages 36, 37, and 38, being collected in any suitable manner.

The separated lighter phase, for example, cream in the case of whole milk, moves toward the axis of rotation 20 through the spaces 32 between discs 10, and into central channel 18. In central channel 18 this phase swirls ahead of the rotation of the bowl, by reason of the principle of the conservation of angular momentum. In fact, it may be theoretically calculated that the lighter phase picks up rotational energy in channel 18. Be this as it may, the swirling action produced materially retards or prevents coalescence in the lighter phase, such as, of the more viscous cream in the case of whole milk, and the lighter phase is carried out of the bowl through central discharge opening 24 and channel 25, in the case of cream apparently as a core of more viscous cream surrounded by a column of less viscous cream.

The bowl of the invention is operated on the full-bowl separator principle, and the customary seals are preferably employed at both the inlet and outlet ends of the bowl. The use of seals for full-bowl operation is well understood in the art, and such seals may be of any suitable type and construction. However, I prefer seals of the type shown and described in my copending application Serial No. 724,311, filed January 25, 1947, now Patent No. 2,554,622, dated May 29, 1951.

Figure 3:
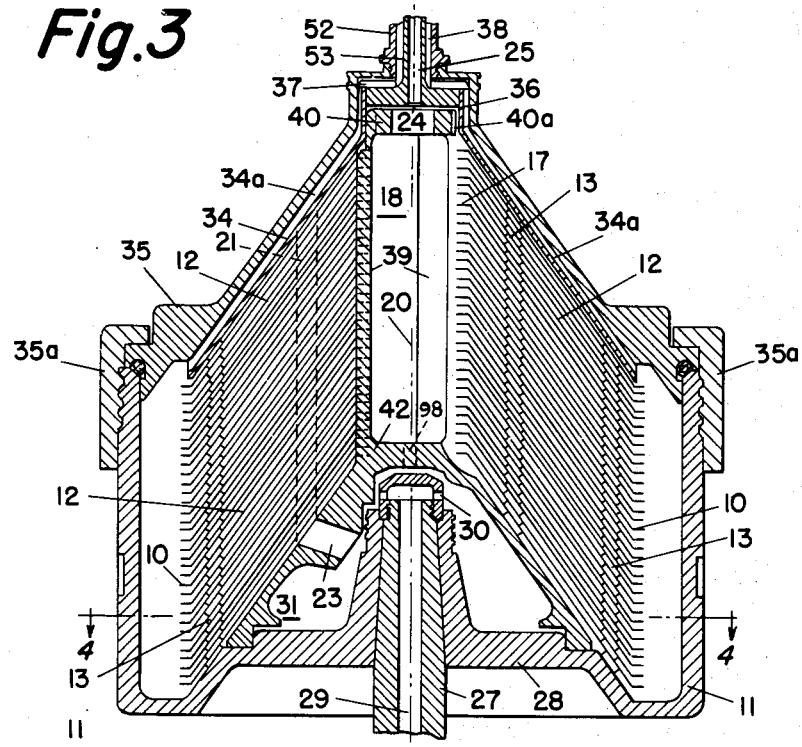
Figure 3 is a sectional elevation of a centrifuge bowl, taken on line 3—3 of Figure 4.
Figure 4:
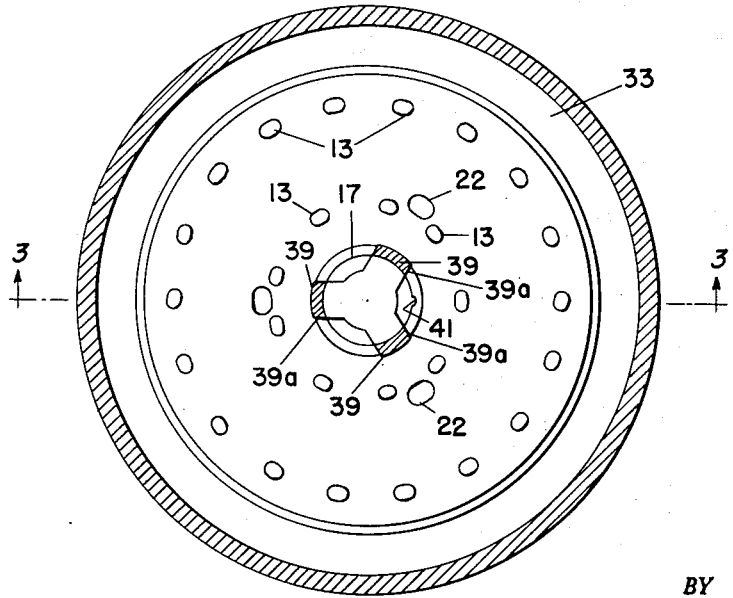
Figure 4 is a cross-sectional view taken on line 4—4 of Figure 3.

In Figures 3 and 4 of the drawings, in which like parts bear the same reference numerals as in Figures 1 and 2, the discs 10, of the disc-stack 12, are held in position by means of bars 39 which, as shown, extend vertically from and are attached to or integral with part 42, ribs 14 and 14a of Figures 1 and 2 being omitted from zone 33. Bars 39 are joined by ring 40 at their upper ends, ring 40 being shown integral with bars 39. Discs 10 are spaced vertically in relation to each other, such as, by means of spacers 13 fastened to the upper surfaces of the discs, the same as in Figures 1 and 2. As shown, each disc 10 of the disc-stack 12 is fitted into position around the bars 39 by means of slots 39a cut into the inner edges 17 of the discs 10 to register with bars 39. Inner edge 17 of each disc 10 is provided with a slot 41 which passes over rib 40a on ring 40 during assembly of the disc-stack 12, thus assuring the desired orientation of the discs 10 in stack 12.

In operation, this embodiment of the invention functions in the same manner as described in connection with Figures 1 and 2, the chief difference being in construction whereby the discs 10 are maintained in alignment in forming disc-stack 12. It will be understood that any other suitable means for this purpose may be substituted or added, if desired, provided channel 18 remains unobstructed. Thus ribs 14 and/or 14a of Figures 1 and 2 may be added or substituted, if desired, or any other suitable construction serving a similar purpose may be employed provided channel 18 is left unobstructed in the sense employed herein.

As will be noted, the provision of an axially positioned unobstructed channel for the collection and discharge of the separated lighter phase axially of the bowl is new to centrifuge bowl construction and operation. Axial channels employed heretofore have been for the introduction of unseparated feed liquid into the bowl, which is entirely foreign to the present invention. Likewise constructions and operations wherein the lighter phase is discharged at a point considerably removed from the axis of rotation of the bowl are entirely foreign to this invention, since in such cases the swirling action produced in this invention in the separated lighter phase is not present or available for the alleviation or prevention of clogging and for carrying the lighter phase out through an axially positioned discharge opening.

Channel 18 may have any suitable diameter consistent with the principles of the invention. Diameters for channel 18 smaller than the diameter of outlet channel 25, or other substituted outlet, are not recommended. Nor are diameters so large as to materially reduce the separating efficiency of disc-stack 12, or other substituted device, such as the circumferentially spaced vertically extending vanes employed in certain high speed centrifuges.

In the design of a separator bowl for full-bowl operation, the diameter of the ultimate outlet for the lighter phase, such as channel 25, is governed in large part by the separating capacity of the bowl, or, in other words, by the rate at which it is desired to draw off the lighter phase. Thus a bowl of smaller separating capacity will usually be designed with a smaller ultimate outlet for this phase, such as channel 25, whereas a bowl of larger separating capacity will have this outlet larger. The viscosity or thickness of the lighter phase is also taken into consideration, as is well understood by persons skilled in the art. Thus, in any well designed bowl this outlet is of a size sufficient to permit free flow therethrough of the separated lighter phase according to its consistency, and the choice of outlet size is within the skill and judgment of persons skilled in bowl design.

Having chosen an outlet diameter, which obviously should be large enough to avoid clogging, it is merely necessary to have channel 18, or its equivalent, of at least equivalent diameter, and preferably of from two to five times said outlet diameter.

Larger diameters for channel 18 may be employed consistent with the separating efficiency desired of disc-stack 12, or other substituted device. In this connection it will be understood that for the same diameter bowl, as channel 18 is made larger, the annular cross-sectional area occupied by the separating device (e. g. disc-stack 12) becomes smaller, with eventual rapid decrease in separating efficiency of the separating device. Accordingly, diameters for channel 18 greater than ten times the diameter of the ultimate lighter phase outlet opening of the bowl are not recommended.

But irrespective of the chosen outlet diameter for the lighter phase, my invention will be found to give a very substantial improvement in alleviating or avoiding the problems of clogging within the bowl.

In full-bowl operation it is customary to control the pressure at both the inlet and one outlet of the bowl. The control of pressure at the inlet is for regulating the rate of feed, and the control at one outlet is for the regulation of back pressure to assure the desired relative volumes of the separated phases, it being understood that as such back pressure increases, the rate of discharge of the separated phase under control decreases, and vice versa. The separated phase chosen for control is the phase which discharges from the bowl under unregulated conditions at a higher rate than desired, and may be either the heavier or the lighter phase according to the liquid being separated, and the design and characteristics of the particular bowl in use.

Control of pressure at the inlet may be accomplished in any suitable manner, such as by a constant displacement pump, a constant gravity head, or otherwise.

Control of back pressure at either outlet may also be accomplished in any suitbale manner, among the simplest being the insertion of an adjustable valve in the discharge line for the particular phase. It might be said that in actual practice, and for purposes of versatility, means for controlling back pressure are frequently installed at each outlet to be used as required.

In this connection it should be noted that whereas in full-bowl separators of the prior art, when operating on whole milk, for instance, the tendency is for the cream to be discharged at higher rates than desired, thus requiring the building up of back pressure in the cream phase, the full-bowl separator of the present invention depending upon its particular design, dimensions of parts, and nature of liquid undergoing separation including its viscosity, sometimes exhibits the opposite characteristic because of the back pressure created by the swirling of the lighter phase before discharge, thus requiring the building up of back pressure in the heavier phase, such as, the skim milk phase, instead of in the lighter phase, such as, the cream phase, in order to effect the discharge of the lighter phase at a desired rate axially of the bowl.

The bowl of the present invention may be made in any desired size and shape, and may be rotated at any desired speed, consistent with the desired separation efficiency.

These are matters of bowl design and operation which are understood by persons skilled in the art. It is after the desired separation has been made or substantially made within the bowl that the swirling action produced in the lighter phase comes into play to assist and cooperate and combine with the separating step to clear away at an appropriate rate the viscous or semi-viscous separated lighter phase, so that continued efficient separation of the lighter phase from the heavier phase may be expeditiously effected.

Therefore, it is to be understood that the following example is by way of illustration and not of limitation.

*Example 1*

A bowl having the general contour of those illustrated in the drawings, and having an interior diameter of 14 inches, was rotated at 6000 R. P. M. The bowl had 100 discs of the type illustrated, and an interior channel similar to channel 18 with a diameter (opening at center of discs) of 2⅛ inches. The lighter phase discharge channel was similar to channel 25, and had a diameter of ⁷⁄₁₆ inch. Whole milk with a butterfat content of 3.7 per cent was passed through the bowl at a temperature of 40° F. and at a rate of 6000 pounds per hour. Skim milk was discharged at a butterfat content of 0.01 per cent by the Babcock test, and cream was discharged with a butterfat content of 39 per cent. This bowl was operated for a period of four hours, that is until the supply of milk was exhausted, without reduction in separating efficiency or clogging, whereas a bowl of similar size and construction but with the conventional center post with wings for the support and alignment of the discs at the center, when operated under similar conditions, showed such evidence of reduced separating efficiency after ten minutes, as to make further operation impracticable. The bowl of this invention, after the above test, was taken apart, and there was no evidence of accumulation of material at the center of the bowl such as would cause eventual clogging.

As pointed out above, for best results, the bowl of my invention should be operated with seals on the inlet and outlet connections. To illustrate a particular manner in which such seals may be constructed and connected, reference is made to Figures 5 and 6 of the drawings in which types of seals described and claimed in my above-mentioned copending application are shown.

Figure 5:
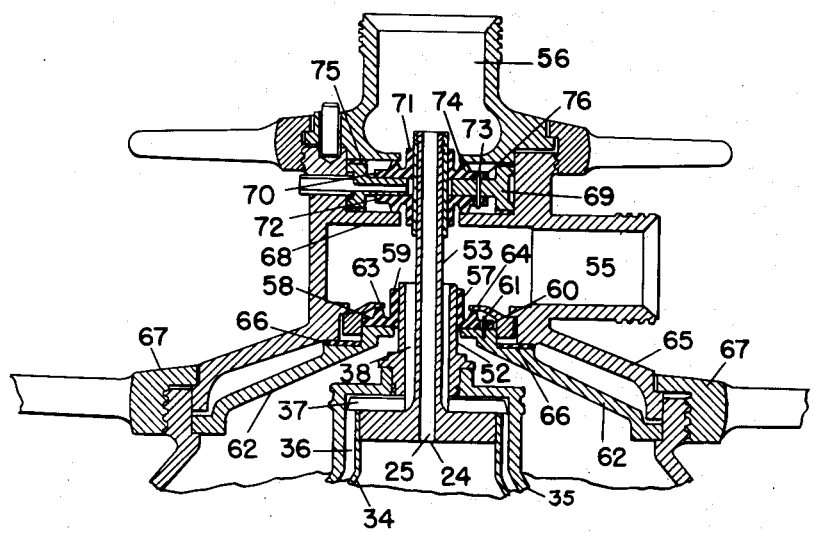
Figure 5 is a sectional elevation (shown broken) of a seal structure for the outlet of the bowl.

In Figure 5 is illustrated a seal construction described and claimed in my above mentioned co-pending application and which is highly useful in the removal of the heavier and lighter phases separately from the bowl.

The heavier phase (e. g., skim milk) is discharged through the conduit formed between the inner wall of a tube 52 and the outer wall of a tube 53. The heavier phase is discharged into a non-rotating or stationary chamber or discharge pipe 55 which communicates with the receiving end of a stationary conduit (not shown) by which the heavier phase is delivered from the machine.

The lighter phase discharge conduit 53 extends beyond the upper extremity of the conduit 52 and this phase is delivered from the conduit 53 into a non-rotating or stationary chamber or discharge pipe 56 through which it passes to an associated conduit (not shown) for delivery from the machine.

As illustrated, the sealing devices at the delivery end of the machine include a flexible seal 57 provided for prevention of leakage downward along the outside of the tube 52 from the chamber 55. This flexible seal includes a flange 58, central tubular portion 59 and enlarged hole 60, this hole being somewhat larger than the projection or pin 61 extending outwardly from the housing cover 62, in order to allow lateral play of the seal. A raised extension or projection 63 is provided on the upper surface of the flange 58, and the under surface of a seal cover 64 is adapted to abut the upper surface of this projection. The seal cover and seal are held in position by an overhanging inner flange formed on the inner wall of the chamber 55, and the under surface of the seal cover 64 is designed to rest upon the upper surface of the projection 63 under the force of gravity or under relatively slight pressure, so that the seal 57 will still be permitted lateral movement relative to the pin 61 and other stationary surfaces, even when fluid is passed under pressure through the machine. By this arrangement, the seal is permitted to accommodate itself to lateral movements of the tube 52 without flexure. A gasket 66 is provided between the housing cover 62 and a lower abutting surface of the wall of the chamber 55 and this abutting surface is adapted to be brought into sealing arrangement with the gasket by the application of force to flanged extension 65 of the wall of the chamber 55 by the securing nut 67.

A wall or flange 68 is formed at the upper end of the chamber 55 and supports a seal locating or supporting member 69 and associated seals for preventing leakage of liquid between the heavy phase discharge-receiving chamber 55 and the light phase discharge-receiving chamber 56. The seal locating members 69 may be in the form of a metal plate, and the seals 70 are located upon opposite sides of that plate. As in the cases of the seals previously described, each of the seals associated with the supporting member 69 comprises a tubular portion 71 and a flanged portion 72. Pins or projections 73 extend from the upper and lower surfaces of the seal supporting member 69, and the flanges 72 are provided with holes which permit lateral play of the seals 70 relative to the projections 73 and other stationary parts, just as in the cases of the seals previously described. The flanges 72 of the seals are also preferably provided with extensions or projections 74 as in the case of the seals previously described. The outer circumference of the seal supporting member 69 is thicker than the central portion thereof and gaskets 75 are provided in order to insure sealing of this circumferentially enlarged portion against associated surfaces.

By the use of the construction illustrated in Figure 5, the heavier and lighter phases may be effectively removed from the bowl without significant leakage either to the outside or from one phase to the other. As pointed out above, valves may be used in the conduit leading from chamber 55, or in the conduit leading from chamber 56, or both, in order to regulate and obtain the desired back pressure in the particular phase or phases.

Figure 6:
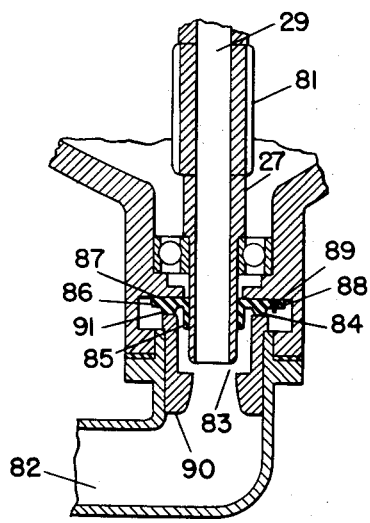
Figure 6 is an elevation, partly in section and shown broken, of a seal structure for the inlet of the bowl.

In Figure 6 of the drawings is shown a seal construction described and claimed in my above-mentioned copending application and which is highly useful for the purposes of introducing feed liquid into the bowl.

In Figure 6 is illustrated the lower end of spindle 27 and its associated inner channel 29. Spindle 27 is driven by a gear 81, which receives power from any suitable source. The channel 29 receives the feed liquid from a non-rotating feed conduit 82, including an enlarged chamber 83 communicating with the channel 29.

The sealing connection between the enlarged chamber 83 constituting the upper end of the feed conduit and the spindle 27 is in the form of a flexible and elastic sealing member 84 having a central tubular part 85 telescoping with the spindle 27. As illustrated, the tubular part 85 of the flexible seal 84 surrounds the spindle 27 and is urged into sealing relationship to the spindle 27 by the pressure of the feed liquid. An extension or flange 86 is formed at the upper end of the tubular portion 85 and is adapted to exert sealing pressure against the surface 87 which constitutes the uppermost portion of the feed conduit 82 and the upper wall of the chamber 83. A projection or pin 88 extends downwardly from the surface 87 and is adapted to enter a slot or enlarged hole 89 formed in the extension or flange 86 of the flexible seal 84. Since this slot or hole is substantially larger in radial dimension than the projection or pin 88, there is thus formed a pin and slot connection which restrains the flexible seal against rotation with the spindle 27, but at the same time permits it to move laterally in accordance with the lateral movements of the spindle 27. By this arrangement, flexing of the seal incident to use of the apparatus is minimized.

A suitable feed piece 90 may be included in the conduit 82 at a point just below the lower extremity of the hollow spindle 27. As illustrated, there is provided a raised extension or projection 91 on the lower surface of the flange 86, as an assistance in locating this flange in close proximity to the surface 87 against which it performs its sealing function when liquid pressure is applied by passage of feed liquid from conduit 82 into channel 29 in spindle 27. The upper surface of flange 86 will thus be caused to rest gently against the surface 87 even when no fluid pressure is applied.

By the use of the construction illustrated in Figure 6, feed liquid may be fed into the bowl without significant leakage to the outside.

It will be noted that in the operation of my process and apparatus the mixture to be separated is delivered to the bowl, and is accelerated in rotation, such as by the channels 23 and/or otherwise, whereupon it is delivered intermediately or in other words at a region spaced outwardly from channel 18, (through channels 21 as shown) into an accelerating-decelerating device, shown for purpose of illustration as the disc-stack 12. As separation of the phases is effected in the disc-stack, the heavier phase flows outwardly with acceleration in tangential velocity, whereas the lighter phase flows inwardly with deceleration in tangential velocity, such acceleration and deceleration being accomplished in the device illustrated by friction between the liquids and the closely spaced discs of the disc-stack. The deceleration of the lighter phase is such as to maintain a fairly constant angular velocity as the lighter phase approaches the axis of rotation. Likewise, the acceleration of the heavier phase is such as to maintain a fairly constant angular velocity as it moves outwardly between the discs. In prior art centrifuges, insofar as I am aware, it has been considered essential to remove the lighter phase under conditions of deceleration, whether such deceleration is effected by the acceleration-deceleration device in the separation zone, or by the use of wings or channels about a center post, or about the point of discharge, or otherwise, or to remove the lighter phase almost immediately upon being released from such decelerating influences, and without significant further movement toward the axis of rotation unattended by further deceleration.

In my invention on the other hand, deceleration, as the lighter phase flows toward the axis of rotation, is purposely stopped short, and the principle of the conservation of angular momentum is effectively utilized to cause a swirling action with increase in angular velocity ahead of that of the bowl, whereby coalescence in the lighter phase is retarded or prevented, or its undesirable effects overcome, so that said lighter phase may be discharged from the bowl along its axis of rotation with alleviation or prevention of sticking and consequent clogging.

For example, when cream is such lighter phase, any such coalescence represents incipient stages in the formation of butter, which being of lower density, tends to form a core in the less viscous cream, and is carried off therewith along the axis of rotation.

In view of the elimination of deceleration about the axis of rotation, pressure is required to force the lighter phase toward said axis. This is conveniently supplied by restricting the rate of discharge of the heavier phase, whether by design and construction of the bowl, or by a valve as previously mentioned, or otherwise.

Accordingly, it can be seen that I have provided a new principle in the separation of liquid phases, and that while I prefer to use an unobstructed central channel, such as channel 18, any other type of channel may be employed even though not strictly unobstructed, provided the principle of my invention is embodied in its operation.

While for purposes of convenience, I have above spoken of cream and skim milk as separate phases, it is, of course, generally known that whole milk is a dispersion of butterfat particles in a continuous liquid phase. Cream is a more concentrated dispersion of this type, and since skim milk still contains some butterfat particles though very small in quantity, it is a less concentrated dispersion.

My process and apparatus are excellently adapted to the separation of dispersions generally into more and less concentrated forms or parts, and has been more particularly described herein in connection with the separation of whole milk into cream and skim milk (as to which it is excellently adapted) for purposes of illustration.

Other dispersions are rubber latex, fat in crude glue, etc.

Having more particularly described my invention, it is to be understood that this is by way of illustration and not by way of limitation, and that modifications may be made without departing from the spirit of the invention. Thus while my invention has been more particularly described in connection with a bowl adapted to be rotated about a vertical axis, it will be understood that my invention is similarly adaptable to a bowl rotating about any other axis, such as a horizontal axis. Then too, my invention, which is directed to the alleviation or prevention of clogging about the axis of the bowl, may be used in combination with devices intended to alleviate or prevent clogging in other parts of the bowl such as between the discs. As an illustration, clogging between the discs is sometimes caused by the presence in whole milk of a very small quantity of substance in granular-like form, which may be originally present or which may be formed in the milk during processing, which substance, being of lighter density, on occasion tends to lodge in the lower spaces 32 formed by the lower discs 10 between channels 21 and channel 18. This condition may be alleviated or prevented by providing slots 95 in the lower discs 10 as illustrated in dotted lines in Figure 2. Slots 95 may be formed by merely cutting away the material of the individual disc 10 between holes 22 and inner edge 17 is illustrated. Since this difficulty usually occurs at the lower end of the bowl, the provision of slots 95 in the lower 5 to 15% of the discs, such as 10%, is ordinarily found adequate.

An alternative for the alleviation or prevention of this difficulty is illustrated in Figure 3. A channel 98 shown in dotted lines, and which is preferably though not necessarily axial, may be provided through part 42. Any such granular-like substances of lighter density that are separated from the feed liquid under centrifugal force in chamber 31 move toward the axis and flow through the channel 98 into channel 18 along with only a small amount of liquid at most. As described above, the lighter phase in channel 18 swirls ahead of the rotation of the bowl, and this swirling action materially retards or prevents coalescence of the lighter phase. Channel 98 is small, for example, a hole ⅛ inch to 3/16 inch in diameter, to limit the amount of flow of liquid therethrough. This channel may be used alone, or in conjunction with slots 95, shown in dotted lines in Figure 2. The use of either or both, or other means to accomplish the same or similar purpose, is, of course, optional though preferred. A similar but smaller diameter channel 98 may be employed, if desired, to function merely as an air vent.

Other types of accelerating-decelerating devices are well known in the art. For example, the well-known wing type accelerating-decelerating device is illustrated in U. S. Patents 1,401,196 and 1,649,118. In adapting such wings to my invention the center support and the central portions of the wings are eliminated, and the wings are held in position by supports about their outer edges, or otherwise as will be immediately apparent to persons skilled in the art upon becoming familiar herewith. A modified wing-type accelerating-decelerating device is shown in U. S. Patent 2,138,468 wherein stratifying plates are illustrated. My invention distinguishes over the disclosure in the last-named patent, among other things in that it operates on the full-bowl principle, and in that the lighter phase is taken off along the axis of rotation to obtain the unexpected results described herein.

While a particular type of disc-stack has been shown and described, it will be understood that this is by way of illustration and that any other type or construction may be substituted. It will also be understood that a disc-stack functions not only as an accelerating-decelerating device, but also for purposes of providing a plurality of thin separating spaces.

Other modifications will occur to persons skilled in the art upon becoming familiar herewith. Accordingly, it is intended that the patent shall cover, by suitable expression in the claims, whatever features of patentable novelty reside in the invention.

This application is a continuation-in-part of my co-pending application Serial No. 128,305, filed November 19, 1949, now abandoned.

I claim:

1. In a centrifuge, the combination of a rotatable centrifugal bowl having a separating chamber, a stack of conical discs in the chamber forming thin separating spaces between the discs, the discs having central holes and the bowl chamber having within the edges of said holes a free space providing unobstructed communication inwardly from said edges toward the rotation axis of the bowl, said free inner space extending continuously through the disc stack and continuously around said edges, means outside said free space engaging the discs and forming a driving connection between the bowl and the discs, an axial feed pipe having a connection with the bowl, the bowl having a feed passage communicating with said pipe for leading the feed to the disc stack at a region spaced outwardly from said free space, the bowl also having a central light component outlet passage leading from one end of said free space and a heavy component outlet passage leading from the outer part of the separating chamber, a stationary discharge pipe outside the bowl and communicating with the central outlet passage, and a seal between the discharge pipe and the bowl to provide a closed path from said free space through the central outlet passage to the discharge pipe.

2. The combination according to claim 1, in which said disc engaging means include a wing extending generally radially from the outer edges of the discs to the bowl periphery and engaged in peripheral notches in the discs to form said driving connection.

3. The combination according to claim 1, in which the bowl also has a feed chamber between the feed pipe and said feed passage, and a hollow tube extending into the inner part of the feed chamber and forming said feed passage.

4. The combination according to claim 1, in which said free space extends inwardly from the discs to the rotation axis of the bowl.

5. In a centrifuge, the combination of a rotatable centrifugal bowl having a separating chamber, an accelerating-decelerating device in said chamber, said accelerating-decelerating device having a central open channel extending in axial direction therethrough and having liquid-flow connection about and with said central channel to provide communication inwardly from said accelerating-decelerating device toward the axis of rotation of said bowl, means for mounting said accelerating-decelerating device in said bowl, means for feeding liquid to said bowl, means within said bowl for directing the feed of liquid to said accelerating-decelerating device at a region spaced outwardly from said central channel, a central light component outlet passage for said bowl leading from one end of said central channel, and a heavy component outlet passage within said bowl leading from the outer part of the separating chamber toward the axis of rotation of said bowl and terminating adjacent said axis.

6. The combination according to claim 5, in which said accelerating-decelerating device is a disc-stack.

7. The combination according to claim 6, in which the means for mounting the disc-stack in the bowl includes a plurality of circumferentially spaced members extending in an axial direction in said bowl and engaging the inner edges of the discs of said disc stack.

8. The combination according to claim 6, in which the lowermost discs have slots extending from said region spaced outwardly from said central channel to said central channel.

9. In a centrifuge, the combination of a rotatable centrifugal bowl having a separating chamber, a stack of conical discs in the chamber forming thin separating spaces between the discs, the discs having central holes and the bowl chamber having within the edges of said holes a free space providing communication inwardly from said edges toward the rotation axis of the bowl, said free inner space extending through the disc stack and about said edges, means in said bowl engaging said discs, an axial feed pipe having a connection with the bowl, the bowl having a feed passage communicating with said pipe for leading the feed to the disc stack at a region spaced outwardly from said free space, the bowl also having a central light component outlet passage leading from one end of said free space and a heavy component outlet passage leading from the outer part of the separating chamber and terminating adjacent said central light component outlet passage, a stationary discharge pipe outside the bowl and communicating with the central outlet passage, a seal between the discharge pipe and the bowl to provide a closed path from said free space through the central outlet passage to the discharge pipe, a second stationary discharge pipe outside the bowl and communicating with the heavy component outlet passage, and a seal between the second discharge pipe and the bowl to provide a closed path from the bowl through the heavy component outlet passage to the second discharge pipe.

References Cited in the file of this patent

UNITED STATES PATENTS

| | | |
|---|---|---|
| 515,053 | Nilsson | Feb. 20, 1894 |
| 1,427,486 | Lindgren | Aug. 29, 1922 |
| 1,644,615 | Sharples | Oct. 4, 1927 |
| 1,917,422 | Bergner | July 11, 1933 |
| 2,578,485 | Nyrop | Dec. 11, 1951 |
| 2,662,687 | Spross | Dec. 15, 1953 |

FOREIGN PATENTS

| | | |
|---|---|---|
| 57,528 | Switzerland | May 15, 1911 |
| 76,984 | Sweden | Apr. 19, 1933 |